United States Patent [19]

Prass et al.

[11] Patent Number: 5,081,212
[45] Date of Patent: Jan. 14, 1992

[54] POLYUREA AND FILM COMPOSED OF AT LEAST ONE MONOMOLECULAR LAYER OF A POLYUREA

[75] Inventors: Werner Prass, Mainz; Ude Scheunemann, Frankfurt am Main, both of Fed. Rep. of Germany

[73] Assignee: Hoechst Aktiengesellschaft, Frankfurt am Main, Fed. Rep. of Germany

[21] Appl. No.: 414,535

[22] Filed: Sep. 29, 1989

[30] Foreign Application Priority Data

Oct. 10, 1988 [DE] Fed. Rep. of Germany ....... 3833440

[51] Int. Cl.$^5$ .............................................. C08G 18/10
[52] U.S. Cl. ..................................... 528/68; 428/411.1
[58] Field of Search ....................... 528/68; 428/411.1

[56] References Cited

U.S. PATENT DOCUMENTS 3,728,301 4/1973 Spence et al. ...................... 524/589

FOREIGN PATENT DOCUMENTS 0199086 10/1986 European Pat. Off. .
0232829 8/1987 European Pat. Off. .

Primary Examiner—Maurice J. Welsh
Assistant Examiner—Rachel Johnson

[57] ABSTRACT

A polyurea of the general formula $$\left[ \begin{array}{c} -N-X-N-CON-Y-NCO- \\ | \quad\;\; | \quad\quad\;\; | \quad\quad\;\; | \\ A \quad\;\; B \quad\quad H \quad\quad H \end{array} \right]_n ,$$

where

X and Y are, independently of one another, a divalent radical whose chain contains in each case at least two carbon atoms, and A and B are, independently of one another, H or ($C_1$–$C_{26}$)alkyl, and n is an integer greater than 4, which polyurea contains at least one ($C_6$–$C_{26}$) alkyl group per repeating unit, is prepared by reacting the diamine NHA-X-NHB with roughly the equimolar amount of a diisocyanate OCN-Y-NCO. The polyurea is suitable for preparing ordered monomolecular LB films on a base (film-substrate-system). For this purpose it is dissolved in a volatile organic solvent which is not miscible with water, the solution is spread at the water-/air interface, and the layer formed is compressed after the solvent has evaporated and it is transferred to a solid layer base by the Langmuir-Blodgett technique.

11 Claims, No Drawings

POLYUREA AND FILM COMPOSED OF AT LEAST ONE MONOMOLECULAR LAYER OF A POLYUREA

DESCRIPTION

The invention relates to specific polyureas having alkyl side chains, to a film composed of at least one monomolecular layer of said polyureas on a solid layer base (=so-called film-substrate-system) and process for preparing the polyureas and the film-substrate-system.

To prepare ordered layers of organic polymers having long-chain side groups, use is predominantly made of the Langmuir-Blodgett (LB) process. In this process, molecules are spread on a water surface and the alkyl side chains are arranged in parallel by reducing the area per molecule. The molecules are pulled onto a substrate by immersion and emersion with constant shear. In this process, one monomolecular layer is transferred per immersion operation, with its order being maintained.

To form LB films, use is made of amphiphilic molecules, i.e. molecules which have a hydrophilic end (a "head") and a hydrophobic end (a "tail"). In order to achieve higher stability of the LB films, polymeric LB films have also already been prepared.

For this purpose monomeric unsaturated amphiphiles were first of all polymerized after the film had been prepared. However, organic polymers having long alkyl side chains have also already been used directly for producing layers (EP-A2-0,232,829). More point defects occur, however, in both types of polymeric films than in monomeric films. The polymerization in the layer results, in virtually every case, in a contraction of the layer with the formation of point defects. In the case of polymer films, the high viscosity of the films results in problems during layer transfer.

The object was therefore to obtain polycondensates, which can be transferred to layer carriers particularly well, from low-molecular starting products.

The present invention achieves this object. It is based on the observation that hydrogen bond formation occurs to an increased extent in polyureas and consequently increases the stability of the layer structure of corresponding films and the tendency for order when spread on water, and the transfer behavior is improved when multilayers are prepared.

It has now been found that ordered layers can be prepared, for example with the aid of the Langmuir-Blodgett technique, on a solid layer base from a polyurea of the general formula (I)

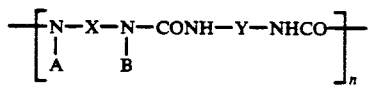
(I)

where
X and Y are, independently of one another, a divalent radical whose chain contains at least two carbon atoms,
A and B are, independently of one another, H or ($C_1$-$C_{26}$)alkyl, and
n is an integer greater than 4,
which polyurea contains at least one $C_6$-$C_{26}$, in particular $C_{14}$-$C_{20}$, alkyl group per repeating unit.

The polyureas used are built up in a strictly alternating manner from diamine and carbonyl units. The different order tendencies of the polymer main chain (tendency to form a polymer tangle) and the alkyl side chain (tendency to crystallize) can be achieved simultaneously.

The introduction of at least one $CH_2$ group into the main chain of the polymer increases its flexibility and the order of the spread layer. At the same time, it is advantageous if X and/or Y contain at least one $CH_2$ group in the chain.

Preferably, the Y chain is free of nitrogen. For example, Y may stand for the radical $(CH_2)_a$, where a is an integer from 2 to 20. The group Y may also stand for the radical $(CH_2CH_2O)_b$—$CH_2$—$CH_2$, where b is a number from 1 to 12. Preferably, Y may also be an unsubstituted or substituted aromatic group, for example an unsubstituted or substituted phenylene or naphthylene radical.

Because of the easier accessibility of the amines and because uniform final products can more easily be obtained, it is advantageous if A=B.

It is furthermore preferable if the chain of the radical X is free of nitrogen. For example, X may have the general formula $(CH_2)_c$—$X^1$—$(CH_2)_c$, where c stands for 0, 1 or 2 and $X^1$ for a substituted or unsubstituted aromatic group. X may be, in particular, a substituted or unsubstituted aromatic group.

If the groups X and/or Y contain a substituted aromatic group or are composed of a substituted aromatic group, this aromatic group may be substituted by at least one of the following radicals:
COOH,
$CO_2$-alkyl, the alkyl group containing 1 to 24 carbon atoms,
alkyl containing 4 to 24 carbon atoms,
O-alkyl, the alkyl group containing 14 to 24 carbon atoms,
$NR^4R^5$, $R^4$ and $R^5$ being, independently of one another, alkyl groups each containing 10 to 24, in particular 14 to 22, carbon atoms,
CO-$NR^4R^5$, $R^4$ and $R^5$ being, independently of one another, hydrogen or alkyl radicals containing 1 to 24 carbon atoms.

This is particularly preferable if A and/or B are hydrogen.

Particularly preferred as substituted aromatic radical in this connection is a 1-substituted 3,5-linked phenylene radical. Various alkyl 4-chloro-3,5-diaminobenzoates are described in German Offenlegungsschrift 1,940,363.

If one of the radicals A, B is a ($C_1$-$C_3$)alkyl group and the other is hydrogen or a ($C_1$-$C_3$)alkyl group, aromatic groups may also be substituted by the abovementioned radicals.

If at least one of the radicals A and/or B is a branched or unbranched alkyl radical containing 4 to 24 carbon atoms, and at least one of the groups X or Y contains a substituted aromatic radical or is composed of a substituted aromatic radical, said aromatic radical may be substituted by one of the following groups:
$OR^2$,
$CH_2OR^2$,
$SO_3R^2$,
$CONHR^2$,
$CONR^2R^3$,
$R^2$ and $R^3$ being, independently of one another, hydrogen, ($C_1$-$C_4$)alkyl or ($C_2$-$C_4$)hydroxyalkyl The polyureas described may be prepared, for example, by reacting a diamine of the formula NHA-X-NHB with roughly equimolar amounts of a diisocyanate OCN-Y-NCO, A, B, X and Y having the meaning described above. For example, diamines of the formula $R^1$—NH—X—NH—$R^1$, $R^1$ being an alkyl group containing 4 to 24, preferably 14 to 22 carbon atoms, can be reacted with roughly equimolar amounts of a diisocyanate of the general formula OCN—$R^3$—NCO, $R^3$ standing for a polymethylene chain containing 0 to 10 carbon atoms.

Examples of diamines which can be used are given in Table 1, and examples of the polyureas prepared in Table 2.

For the polyaddition, instead of one diamine or one diisocyanate in each case, mixtures of diamines or diisocyanates may be used.

To prepare the films according to the invention, the organic polyaddition products are dissolved in a volatile solvent (for example $CH_2Cl_2$, optionally with the addition of a water-soluble, strongly polar solvent such as dimethylformamide, dimethyl sulfoxide or N-methylpyrrolidone) and placed (spread) on the surface of an aqueous solution in a film balance. The mean area per repeating unit is calculated from the size of the surface, the spreading volume and the concentration of the solution. Phase changes on compressing the molecules can be traced in the shear/area isotherms.

The molecules are pushed together with a barrier, the alkyl chains being oriented essentially perpendicular to the boundary layer as the surface density increases. During the compression, self-organization of the molecules at the boundary layer produces a monomolecular film whose constant layer thickness is determined by the chain length of the molecules and their angle of tilt (that is the angle through which the molecule chains on the surface of the water are tilted with respect to the normal). The typical thickness of such a film is 2–3 nm.

The film is removed from the surface of the water with constant shear by immersion or emersion of a suitable substrate, with the order being maintained.

Water or aqueous solutions are generally used as the subphase for preparing the monomolecular film. However, other liquids having high surface tension such as, for example, glycerol, glycol, dimethyl sulfoxide, dimethylformamide or acetonitrile may also be used provided the polyamides do not dissolve in said liquids.

Possible bases are any solid, preferably dimensionally stable substrates made of various materials. The substrates used as layer base may, for example, be transparent or translucent, electrically conducting or insulating. The substrate may be hydrophobic or hydrophilic. The surface of the substrate on which the LB layer is deposited may be hydrophobized. The surface of the substrate to be coated should be as clean as possible in order not to impede the formation of a thin, ordered layer. In particular, the presence of surface-active substances on the surface of the substrate to be coated may impair the film preparation. It is possible to first provide the substrate acting as layer base with an intermediate film on the surface to be coated before the LB films are deposited in order, for example, to improve the adhesion of the film to the substrate.

Examples of materials used for the substrates are metals, such as, for instance, gold, platinum, nickel, palladium, aluminum, chromium, niobium, tantalum, titanium, steel and the like. Other suitable materials for the substrates are plastics, such as, for example, polyesters, for instance polyethylene terephthalate or polybutylene terephthalate, polyvinyl chloride, polyvinylidene chloride, polytetrafluoroethylene, polystyrene, polyethylene or polypropylene.

Equally, semiconductors, such as silicon, germanium or gallium arsenide, or alternatively glass, silicon dioxide, ceramic materials or cellulose products are possible for the substrates. The surface of glass and other hydrophilic substrates may, if necessary, be hydrophobized in a manner known per se by reaction with alkylsilanes or hexamethyldisilazane. The choice of substrate materials depends primarily on the application of the film-substrate-system prepared from the film according to the invention. For optical components, transparent, translucent substrates are as a rule used as layer bases. If the film-substrate-systems according to the invention are used, for example, in electronics or in electrochemical processes, in particular, electrically conductive materials such as metals or metallic surface layers, for example, on plastic films or glass are used as substrates.

The substrates used as bases for the films according to the invention may have any desired form depending on the application. For example, they may take the form of films, sheets, panels, strips or even cylinders, or they may be selected from any other desired forms. In general, the layer bases will be flat, two-dimensional substrates such as, for example, films, sheets, panels, strips or the like. The surface of the substrate to be coated is preferably smooth, as is usual for the preparation of LB films. In the case of flat, two-dimensional substrates, the films according to the invention may be deposited on one or both surfaces of the substrate.

The film according to the invention is notable for a stable multilayer structure with few point defects and an order in the layer which can be adjusted by means of the molecular structure.

Such films on substrates are suitable, for example, in optical waveguide systems or for preparing filters for optical purposes. Owing to the low critical surface tension, the films are also suitable for improving the frictional properties of materials, for preparing protective layers and also for further relevant applications.

The invention is explained in more detail by the following examples.

EXAMPLE 1

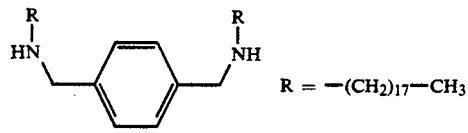

$R = -(CH_2)_{17}-CH_3$ 27.0 g (0.1 mol) of octadecylamine and 6.7 g (0.05 mol) of terephthalaldehyde are suspended in 400 ml of ethanol and boiled for 2 hours under reflux. The product is then allowed to cool down overnight and crystallized from ethanol. 26.2 g (0.041 mmol) of colorless platelets having a melting point of 73°–74° C. are obtained. $^1$H-NMR (CDCl$_3$, 100 MHz): $\delta=0.85$ (t), 1.25 (m), 1.6 (m), 3.6 (t), 7.77 (s), 8.3 (t).

12.74 g (20 mmol) of the Schiff's base are dissolved in 200 ml of ethanol in a glass autoclave at 50° C., 12 g of freshly prepared Raney nickel are added and hydrogenation is carried out for 90 minutes at 3 bar. The autoclave is then cooled down and let down. The nickel is filtered off and the ethanol is removed using a rotary evaporator. The crude product is obtained in virtually quantitative yield. 1.8 g of the crude product are purified by column chromatograph using silica gel (mobile phase chloroform/methanol 20:1 (v/v)). 1.22 g of pure product (white powder) having a melting point of 76°-78° C. are obtained.

$^1$H-NMR (CDCl$_3$, 100 MHz): δ=0.85 (t), 1.25 (m), 2.28 (m), 2.6 (m), 3.75 (m), 7.26 (s).

The derivative containing two N-hexadecyl chains was also prepared in accordance with this specification.

EXAMPLE 2

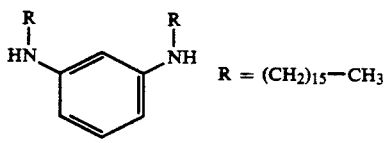

R = (CH$_2$)$_{15}$—CH$_3$ 36.3 g (0.132 mol) of palmitic chloride are dissolved in 400 ml of N-methylpyrrolidone and a solution of 6.48 g (0.06 mol) of 1,3-phenylenediamine and 18.24 g (0.08 mol) of triethylamine in 200 ml of N-methylpyrrolidone is added at room temperature in the course of one hour. The mixture is allowed to stand overnight at room temperature, the precipitated product is filtered by suction and crystallized from chloroform, and 25.6 g (44 mmol) of a white powder having a melting point of 133.2°-133.7° C. are obtained.

$^1$H-NMR (trifluoroacetic acid, 100 MHz): δ=0.91 (t), 1.1-1.7 (m), 1.7-2.1 (m), 2.76 (t), 7.4 (m), 7.8 (m).

11.7 g (20 mmol) of the amide prepared above are dissolved in 500 ml of dry tetrahydrofuran at 55° C. and added to a suspension of 10 g (0.264 mol) of LiAlH$_4$ in 100 ml of dry tetrahydrofuran in the course of 10 minutes. Then the mixture is boiled under reflux for 22 hours. After cooling, the excess LiAlH$_4$ is destroyed while cooling with ice by adding 20 ml each of water, 15% NaOH and water again. The precipitated aluminum oxide is filtered off by suction and the filtrate is evaporated to dryness. The crude product is dissolved in toluene and washed with water. The organic phase is dried with Na$_2$SO$_4$ and recrystallization from methanol is carried out after removing the solvent. 6.5 g (12 mmol) of a light gray powder having a melting point of 88°-89° C. are obtained.

$^1$H-NMR (CDCl$_3$, 100 MHz): δ=0.87 (t), 1.0-1.4 (m), 1.4-1.8 (m), 3.08 (t), 5.8-6.1 (m), 6.96 (t).

All the p-substituted and m-substituted N,N'-dialkyl-substituted phenylenediamines and also the N,N'-dialkylsubstituted m-xylylenediamines containing n-tetradecyl, n-hexadecyl and n-octadecyl radicals were synthesized in accordance with this process.

EXAMPLE 3

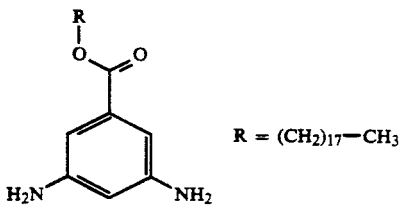

R = (CH$_2$)$_{17}$—CH$_3$ 135.25 g (0.5 mol) of octadecanol and 75.6 g (0.75 mol) of triethylamine are dissolved in 1.2 liters of dry chloroform and cooled to 10° C. by cooling with ice. A solution of 12.07 g (0.52 mol) of 3,5-dinitrobenzoyl chloride in 350 ml of dry chloroform is then added in the course of 1.5 hours in a manner such that the temperature does not rise above 15° C. After completing the addition, the mixture is heated to room temperature while stirring and stirring is continued at room temperature for a further 2 hours. The reaction solution is then shaken out three times in each case with 1N HCl, water, 5% Na$_2$CO$_3$ solution and water again, the organic phase is dried with Na$_2$SO$_4$ and the solvent is distilled off in vacuo. The crude product is recrystallized from ethanol and dried in vacuo at 30° C. 183 g (0.39 mol, 79% of theory) of slightly yellow-colored crystals having a melting point of 74°-78° C. are obtained.

$^1$H-NMR (CDCl$_3$, 100 MHz): δ=0.87 (t), 1.1-1.6 (m), 1.7-2.0 (m), 4.45 (t), 9.1-9.3 (m).

181 g (0.39 mol) of octadecyl 3,5-dinitrobenzoate are dissolved in 700 ml of toluene and hydrogenated for 2 hours at 100° C. and 20 bar of H$_2$ in a 2 liter stainless steel autoclave using 5 g of Pt-carbon contact catalyst. After filtering off the catalyst, the solvent is distilled in vacuo and the crude product is recrystallized from ethyl acetate and ethanol. 142 g (0.35 mol, 90% of theory) of a white powder having a melting point of 86°-87° C. is obtained.

$^1$H-NMR (dimethylsulfoxide-d$^6$, 100 MHz): δ=0.86 (t), 1.1-1.5 (m), 1.5-1.9 (m), 4.15 (t), 4.9 (s), 6.01 (t), 6.41 (d).

The n-tetradecyl ester, the n-hexadecyl ester, the N-hexadecylamide, the N-octadecylamide and the N,N-dioctadecylamide of 3,5-diaminobenzoic acid were prepared by analogy with this specification.

EXAMPLE 4

Polyaddition with hexamethylene diisocyanate 5.0 g of hexadecyl 3,5-diaminobenzoate are dissolved in 70 ml of N-methylpyrrolidone at 40° C. 2.23 g of hexamethylene diisocyanate are added to this solution. Stirring is carried out for four hours at 40° C. until the starting products can no longer be detected by thin-layer chromatography. The product is then precipitated in methanol and dried in a vacuum drying oven at 40° C. Yield: 4.306 g.

With slight modifications, the other synthesized diamines can be reacted with hexamethylene diisocyanate to form polyureas in accordance with this specification.

EXAMPLE 5

Polyaddition with phenylene diisocyanate 5.0 g of N,N,-dihexadecyl[1,4-xylylidenediamine] are dissolved in 150 mol of toluene at 40° C., 1.37 g of 1,4-phenylene diisocyanate are added and stirring is carried out for 8 hours at this temperature. After this time, the starting product can no longer be detected by thin-layer chromatography. The product is precipitated in acetone, dissolved in N-methylpyrrolidone and reprecipitated by pouring the solution into acetone. It is then dried in a vacuum drying oven at 40° C. Yield: 7.1 g.

With slight modifications, the other synthesized diamines can also be reacted with phenylene diisocyanate to form polyureas in accordance with this specification.

EXAMPLE 6

Film preparation by the LB process

A glass microscope slide (76 mm×26 mm) is cleaned by the following process:

The glass is placed for one hour in a freshly made-up mixture composed of four parts of concentrated H$_2$SO$_4$ and one part of 30% H$_2$O$_2$ at 60° C., rinsed with clean water and subjected to ultrasonic radiation for 15 minutes at 50° C. in a cleaning solution (Extran ® AP 11, concentration 2–4 g/l). The slide is then thoroughly rinsed again with clean water and dried in a warm air stream. This is followed by a treatment with hexamethyldisilazane vapor (10 minutes at 70° C.) for the purpose of hydrophobizing.

Multilayers of the polyurea prepared in Example 4 are transferred to the glass slide by the Langmuir and Blodgett process by spreading 0.25 cm³ of a solution of 5 mg of the polyurea in 10 cm³ of a mixture of 1 ml of N-methylpyrrolidone and 9 ml of $CH_2Cl_2$ on an aqueous subphase at a subphase temperature of 30° C. in a Langmuir film balance. The shear is adjusted to 15 mN/m by reducing the water surface covered with monomolecular film and kept constant at this value. The base is now immersed vertically from above in the film balance through the water surface (immersion speed: 20 mm/min) and removed again after a short pause (10 sec.) at the lower reversal point (emersion speed: 10 mm/min). In this process, a monolayer is transferred to the base both during the immersion process and also in the emersion process. A total of 20 double layers are transferred by repeating the immersion process several times after a waiting time of one minute in each case at the upper reversal point. The transfer ratios are 90%. Optically clear, transparent layers are also obtained when 50 monolayers and over are transferred.

EXAMPLE 7

Ellipsometric layer thickness and refractive index measurements

A silicon chip (40 mm × 10 mm) is cut out of a silicon wafer and cleaned as follows:

1. Treatment for 1 hour in a hot (60° C.), freshly made up mixture composed of one part of 30% $H_2O_2$ and four parts of concentrated $H_2SO_4$. This is followed by rinsing with clean water.
2. Immersion for 30 seconds in HF solution buffered with $NH_4F$, followed by rinsing again with clean water.

After this treatment, the silicon chips are hydrophobic (contact angle with respect to water: 75°).

Layers of a polyurea obtained from p-xylylene di[N,N'-bishexadecyl]amine and hexamethylene diisocyanate are transferred onto the silicon chip as in Example 6 by the Langmuir and Blodgett process (subphase: water at 30° C., shear: 20 mN/m, immersion speed: 20 mm/min, emersion speed: 10 mm/min, pause at upper reversal point: 1 min). A monolayer is transferred in each case both on immersion and also on emersion (transfer ratio: 95%). Samples are prepared in each case having 10, 30, 50 and 70 monolayers of the polyurea and the layer thicknesses and the refractive index of the LB films are measured ellipsometrically (result: refractive index at 633 nm: 1.53, layer thickness: 2.3 nm/monolayer).

EXAMPLE 8

Thermal stability measurements

A silicon chip (40 mm × 10 mm) is cut out of a thermally oxidized silicon wafer (oxide layer thickness: 160 nm) and placed for one hour at 60° C. in a freshly prepared mixture composed of one part of 30% $H_2O_2$ and four parts of concentrated $H_2SO_4$. After rinsing thoroughly with clean water, the chip is treated in an ultrasonic bath for 15 minutes at 50° C. with an alkaline cleaning bath (Extran ®AP 11, concentration: 2–4 g/l), thoroughly rinsed with clean water and dried in a warm air stream. This is followed by a treatment with hexamethyldisilazane vapor (10 minutes at 70° C.) for the purpose of hydrophobizing.

Coating with 8 monolayers by the LB method is carried out with the same polyurea as described in Example 7.

The coated base is heated up in a special apparatus having a linear temperature gradient (0.5° C./sec). During the heating up process, the thickness of the LB layer is measured using the intensity of a vertically polarized laser beam (633 nm) reflected from the sample. The temperature at which the maximum change in the layer thickness occurs is 90° C. for the polyurea used (for comparison: this temperature is 70° C. for LB layers of 22-tricosenoic acid).

EXAMPLE 9

Measurements of the critical interfacial energy

A silicon chip (40 mm × 10 mm) is cleaned as in Example 7 and coated with eight monolayers of the polyurea used in Examples 7 and 8 as in Example 7 (temperature of the subphase: 30° C.).

Liquid drops of a series of n-alkanes ($C_{12}H_{25}$–$C_{16}H_{34}$) are placed on the surface of the transferred layers and the contact angles between the liquid drops and the surface are measured. The critical surface tension is determined from these contact angles by the Zisman method. A value of 23.8 mN/m is found (for comparison: a value of 31 mN/m is found for this measurement in the case of a polyethylene surface).

TABLE 1

| Amines which can be used |  |
| --- | --- |
| HN—X—NH |  |
| A        B |  |
| A=B | X |
| n-$C_{18}H_{37}$ | 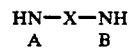 |
| n-$C_{16}H_{33}$ | " |
| " | 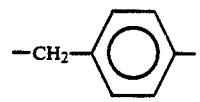 |
| n-$C_{14}H_{29}$ | " |
| n-$C_{18}H_{37}$ | " |
| H | 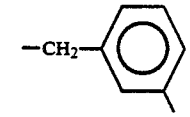 |
| H | 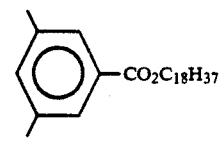 |

TABLE 1-continued

Amines which can be used $$HN-X-NH$$
$$\phantom{HN-}A\phantom{-X-}B$$

| A=B | X |
|---|---|
| H | (phenyl)-CO$_2$C$_{14}$H$_{29}$ |
| H | (phenyl)-CONHC$_{16}$H$_{33}$ |
| H | (phenyl)-CONHC$_{18}$H$_{36}$ |
| H | (phenyl)-CON(C$_{18}$H$_{37}$)$_2$ |
| n-C$_{14}$H$_{29}$ | (phenyl) |
| n-C$_{18}$H$_{37}$ | (phenyl) |

TABLE 2

Polyureas prepared $$+N-X-N-CO-NH-Y-NH-CO+$$
$$\phantom{+N-}A\phantom{-X-}B$$

| A=B | X | Y |
|---|---|---|
| H | (phenyl)-CO$_2$C$_{16}$H$_{33}$ | —(CH$_2$)$_6$— |
| C$_{16}$H$_{33}$ | —CH$_2$—(phenyl)—CH$_2$— | " |
| H | (phenyl)-CONHC$_{16}$H$_{33}$ | " |

TABLE 2-continued

Polyureas prepared $$+N-X-N-CO-NH-Y-NH-CO+$$
$$\phantom{+N-}A\phantom{-X-}B$$

| A=B | X | Y |
|---|---|---|
| C$_{16}$H$_{33}$ | —CH$_2$—(phenyl)—CH$_2$— | 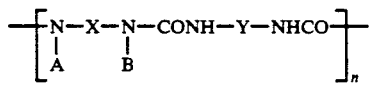 (= p-phenylene) |
| H | (phenyl)-CO$_2$C$_{16}$H$_{33}$ | " |
| H | (phenyl)-CONHC$_{16}$H$_{33}$ | " |

We claim:
1. A polyurea of the general formula

$$-\left[\begin{array}{c}N-X-N-CONH-Y-NHCO\\ |\phantom{-X-}|\\ A\phantom{-X-}B\end{array}\right]_n-$$

wherein Y is (CH$_2$)$_d$, (CH$_2$CH$_2$O)$_b$—CH$_2$CH$_2$—or an unsubstituted or substituted aromatic group, d is an integer from 2 to 20 and b is an integer from 1 to 12,
X is an unsubstituted or substituted aromatic group or has the general formula $$-(CH_2)_c-X^1-(CH_2)_c-$$

where c=0, 1 or 2 and X$^1$ is an unsubstituted or substituted aromatic group,
A and B are, independently of one another, H or (C$_1$-C$_{26}$)alkyl, and
n is an integer greater than 4,
which polyurea contains at least one (C$_6$-C$_{26}$)alkyl group per repeating unit.
2. A polyurea as claimed in claim 1, wherein Y is an unsubstituted or substituted phenylene or napthylene radical.
3. A polyurea as claimed in claim 1, wherein at least one of the radicals X and Y contains a substituted aromatic group which is substituted by at least one of the following radicals:
COOH
CO$_2$-alkyl, where the alkyl group contains 1 to 24 carbon atoms,
alkyl containing 4 to 24 carbon atoms,
O-alkyl, where the alkyl group contains 14 to 24 carbon atoms,
NR$^4$R$^5$, where R$^4$ and R$^5$ are, independently of one another, an alkyl radical each containing 10 to 24 carbon atoms, CO—NR⁴R⁵, where $R^4$ and $R^5$ are, independently of one another, hydrogen or an alkyl radical containing 1 to 24 carbon atoms.

4. A polyurea as claimed in claim 3, wherein $R^4$ and $R^5$ are, independently of one another, an alkyl radical each containing 14 to 22 carbon atoms.

5. A polyurea as claimed in claim 3, wherein the aromatic group is a 1-substituted, 3,5-linked phenylene radical.

6. A polyurea as claimed in claim 1, wherein A, B or both are, independently of one another, a branched or unbranched alkyl radical containing 4 to 24 carbon atoms, and at least one of the radicals X and Y contains a substituted aromatic group which is substituted by one of the radicals:
$OR^2$,
$CH_2OR^2$,
$SO_3R^2$,
$CONHR^2$,
$CONR^2R^3$,
wherein $R^2$ and $R^3$ are, independently of one another, H, $(C_1-C_4)$-alkyl or $(C_2-C_4)$hydroxyalkyl.

7. A polyurea as claimed in claim 6, wherein A, B or both are, independently of one another, a branched or unbranched alkyl radical containing 14 or 22 carbon atoms.

8. A polyurea as claimed in claim 3, wherein at least one of the radicals A and B is hydrogen.

9. A process for preparing a polyurea as claimed in claim 1, comprising reacting a diamine of the formula NHA—X—NHB with roughly equimolar amounts of a diisocyanate of the formula OCN—Y—NCO, wherein A and B are, independently of one another, H or $(C_1-C_{26})$ alkyl, X is an unsubstituted or substituted aromatic group or has the general formula $$-(CH_2)_c-X^1-(CH_2)_c-$$

where $C=0$, 1 or 2 and $X^1$ is an unsubstituted or substituted aromatic group, and Y is $(CH_2)_d$, $(CH_2CH_2O)_b$—$CH_2CH_2$—or an unsubstituted or substituted aromatic group, d is an integer from 2 to 20 and b is an integer from 1 to 12.

10. A film-substrate-system containing a solid layer base and at least one solid thin layer deposited thereon composed of a polymer containing carbonamide groups, wherein the polymer is a polyurea as claimed in claim 1.

11. A process for preparing a film-substrate-system as claimed in claim 10, comprising dissolving said polyurea in a volatile organic solvent which is not miscible with water to form a solution, spreading the solution on the surface of an aqueous solution, evaporating the volatile organic layer to form a layer, and, after the solvent has evaporated, compressing and transferring the layer formed to a solid layer base by the Langmuir-Blodgett technique.

* * * * *